United States Patent
Rasche et al.

(10) Patent No.: US 7,366,875 B2
(45) Date of Patent: Apr. 29, 2008

(54) METHOD AND APPARATUS FOR AN EFFICIENT MULTI-PATH TRACE CACHE DESIGN

(75) Inventors: Galen A. Rasche, Urbana, IL (US); Jude A. Rivers, Cortlandt Manor, NY (US); Vijayalakshmi Srinivasan, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/069,014

(22) Filed: Mar. 1, 2005

(65) Prior Publication Data

US 2006/0155932 A1    Jul. 13, 2006

Related U.S. Application Data

(60) Provisional application No. 60/632,428, filed on Dec. 1, 2004.

(51) Int. Cl.
*G06F 9/30* (2006.01)
(52) U.S. Cl. .................................. 712/205; 711/125
(58) Field of Classification Search ............. 712/33, 712/233, 205; 711/125
See application file for complete search history.

(56) References Cited

U.S. PATENT DOCUMENTS

| | | | | |
|---|---|---|---|---|
| 6,073,213 A | * | 6/2000 | Peled et al. | 711/125 |
| 2002/0095553 A1 | * | 7/2002 | Mendelson et al. | 711/118 |

OTHER PUBLICATIONS

"Trace Preconstruction"; Jacobson et al.; 2000; ACM.*
D. Friendly, S. Patel, and Y. Patt, "Alternative Fetch and Issue Policies for the Trace Cache Fetch Mechanism." In Proceedings of the 30th International Symposium on Microarchitecture, Dec. 1997.
B. Black, B. Rychlik, and J. Shen, "The Block-Based Trace Cache." In Proceedings of the 26th International Symposium on Computer Architecture, May 1999.
Q. Jacobson, E. Rotenberg, and J. E. Smith, "Path-based Next Trace Prediction." In Proceedings of the 30th International Symposium on Microarchitecture, Dec. 1997.

* cited by examiner

*Primary Examiner*—Tonia L. M. Dollinger
*Assistant Examiner*—Benjamin Geib
(74) *Attorney, Agent, or Firm*—Ference & Associates LLC

(57) ABSTRACT

A novel trace cache design and organization to efficiently store and retrieve multi-path traces. A goal is to design a trace cache, which is capable of storing multi-path traces without significant duplication in the traces. Furthermore, the effective access latency of these traces is reduced.

8 Claims, 9 Drawing Sheets

METHOD AND APPARATUS FOR AN EFFICIENT MULTI-PATH TRACE CACHE DESIGN

CROSS-REFERENCE TO RELATED APPLICATION

This application claims priority from U.S. Provisional Patent Application Ser. No. 60/632,428, filed on Dec. 1, 2004.

FIELD OF THE INVENTION

The present invention generally relates to the management of trace caches in a computer system. More specifically, the invention relates to the efficient storage techniques for multi-path traces using a multi-level novel trace cache design.

BACKGROUND OF THE INVENTION

Throughout the instant disclosure, numerals in brackets—[ ]—are keyed to the list of numbered references towards the end of the disclosure.

Trace caches offer a means to increase instruction fetch bandwidth, leading to improved processor performance. However, they tend to suffer from high levels of instruction redundancy. Part of this is caused by the way in which traces are formed. For example, if a small loop is unrolled in a trace, this will increase instruction duplication. Ending traces on backward branches can eliminate this. However, this approach tends to severely limit the length of formed traces. Another source of redundancy is multi-path traces. This occurs when the conditional branches within a trace tend to vary in their outcome. For example, as shown in FIG. 1, a trace starting with basic block A might include the basic blocks ABCDE or ABXY, depending on the outcome of the conditional branches in the trace.

Two known prior solutions that reduce multi-path redundancy include: partial matching [1] and a block-based trace cache [2]. Partial matching [1] uses a predictor to select blocks out of the trace that will likely be used by the processor. Using the previous example, only trace ABCDE would be stored in the trace cache. Another trace, say XYZKJ may also be stored. In order to issue the instructions for the path ABXY, the trace ABCDE is issued first, and the predictor selects AB from the trace. Following this, trace XYZKJ is issued, and the predictor selects block XY from the trace. This technique can greatly reduce the redundancy in the trace cache, but it is also very complex to implement.

In the previous example, two cache accesses were required to obtain the single trace ABXY. In the worst case, each basic block of the desired trace can reside in a different cache line, resulting in several cache accesses. These accesses represent an expensive waste of power, since there are multiple accesses to the trace cache and many of the instructions fetched from the trace cache are not used. In addition to this, there can be an increase in latency if some of the traces are stored in the same bank in the trace cache. Since multiple access cycles would be required to issue the necessary traces, this can lead to an increase in access latency.

Block-based trace caches [2] store only a basic block in each bank of a 'block cache'. To issue a trace from the block cache, a trace predictor is used to determine which line within each bank contains a desired basic block, and all the banks are accessed simultaneously to issue the basic blocks.

The chain of basic blocks is then merged and issued to the processor. This technique is very efficient at reducing redundancy because all duplication within a single bank is eliminated. However, block-based trace caches also suffer from fragmentation of the different trace lines because a basic block might not fill the entire line. This reduces the length of a trace that can be issued. In addition, the "block cache" implementation as it is proposed does not alleviate the question of access latency as trace caches increase in size.

As trace caches increase in size, they will have high power-per-access requirements and increased access latencies. These problems are inherent in increasing the size of any cache.

In view of the foregoing, a need has been recognized in connection with overcoming the shortcomings and disadvantages presented by conventional organizations of trace caches.

SUMMARY OF THE INVENTION

In accordance with at least one presently preferred embodiment of the present invention, there is broadly contemplated a novel trace cache design and organization to efficiently store and retrieve multi-path traces. In a preferred embodiment, the multi-path traces are split into "header" and "trailer" portions, and stored separately in header and trailer banks. Furthermore, a multi-level trace cache organization is used to store and retrieve the header portion with minimum access latency.

In summary, one aspect of the invention provides an apparatus for providing a trace cache organization system, the apparatus comprising: a header cache which stores a header portion of traces; and a trace cache adapted to store header and trailer portions of traces, the trace cache comprising at least one hierarchical cache level.

Another aspect of the invention provides a method of providing a trace cache organization system, the method comprising the steps of: providing a header cache which stores a header portion of traces; and providing a trace cache adapted to store header and trailer portions of traces, the trace cache comprising at least one hierarchical cache level.

Furthermore, an additional aspect of the invention provides a program storage device readable by machine, tangibly embodying a program of instructions executed by the machine to perform method steps for providing a trace cache organization system, the method comprising the steps of: providing a header cache which stores a header portion of traces; and providing a trace cache adapted to store header and trailer portions of traces, the trace cache comprising at least one hierarchical cache level.

For a better understanding of the present invention, together with other and further features and advantages thereof, reference is made to the following description, taken in conjunction with the accompanying drawings, and the scope of the invention will be pointed out in the appended claims.

DESCRIPTION OF PREFERRED EMBODIMENTS

There is proposed herein a novel trace cache design and organization to efficiently store and retrieve multi-path traces. A goal is to design a trace cache, which is capable of storing multi-path traces without significant duplication in the traces. Furthermore, the effective access latency of these traces is reduced.

A trace is divided into two parts: a header and a trailer. The header includes the first N instructions and the trailer is the remaining instructions. For example, in FIG. 1, the header includes AB, and the two trailers following this header are CDE and XY. The header-trailer trace cache uses this splitting of the traces to store the headers in a header bank and the trailers in trailer banks. The latency to access the header portion of the trace is further reduced using a multi-level trace cache organization.

Figure 2:
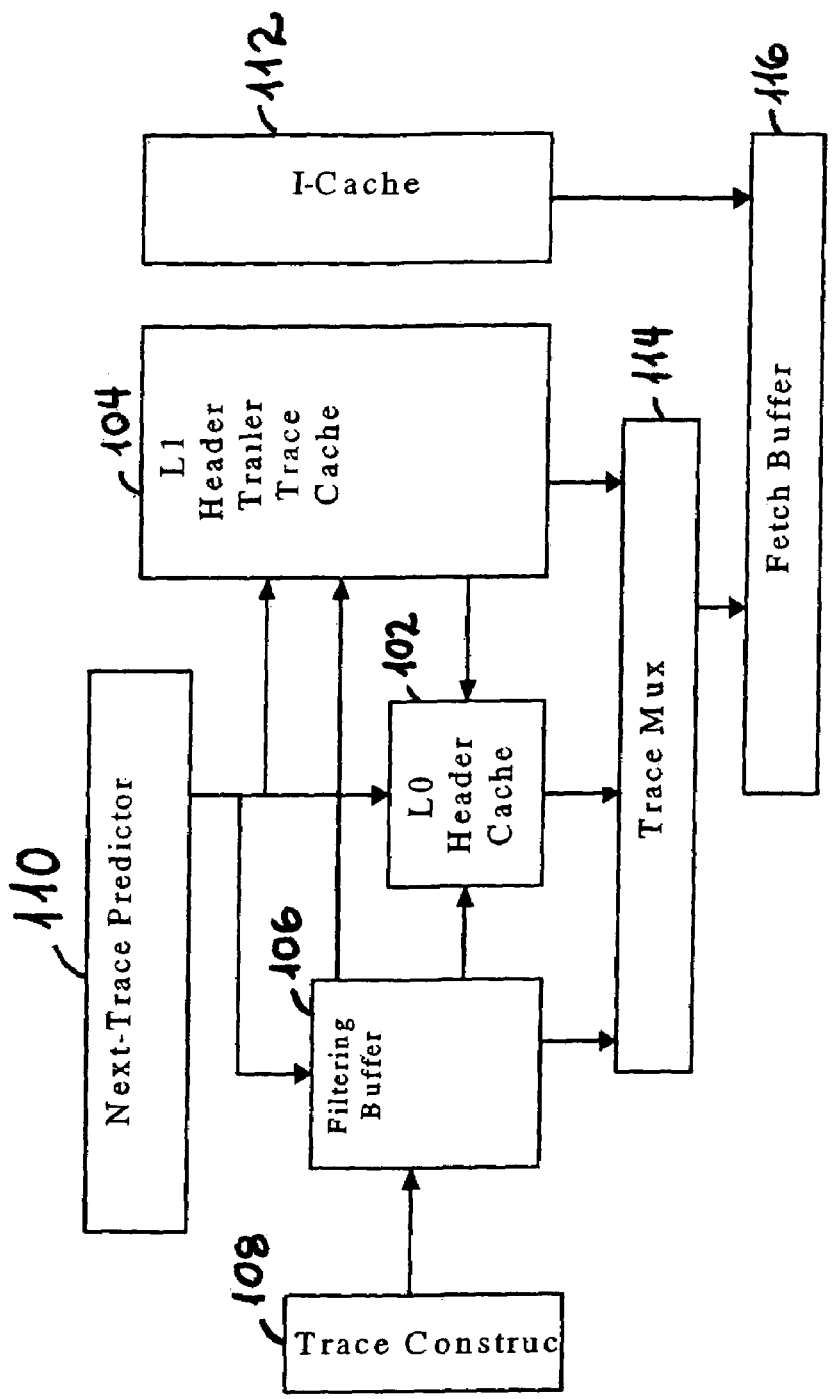
FIG. 2 shows a high-level block diagram of an embodiment of a header-trailer trace cache.

FIG. 2 shows a high-level block diagram depicting operations of at least one embodiment of the present invention. A L0 header cache 102 stores the header portion of the traces, and is optimized to provide minimum access latency for the headers. The L1 trace cache 104 is larger and slower compared to the L0 header cache, and stores both the headers and the trailers. A header-trailer trace cache organization can thus deliver the "header" instructions to the processor with a very small access time, and the access latency to the rest of the instructions, found in the trailer, can be hidden since the "trailer" is fetched in the background while the processor is processing the "header" instructions. In contrast, other prior work like "partial matching" [1] requires multiple accesses to fetch a single trace, and all of these accesses are in the critical path of the processor.

Figure 1:
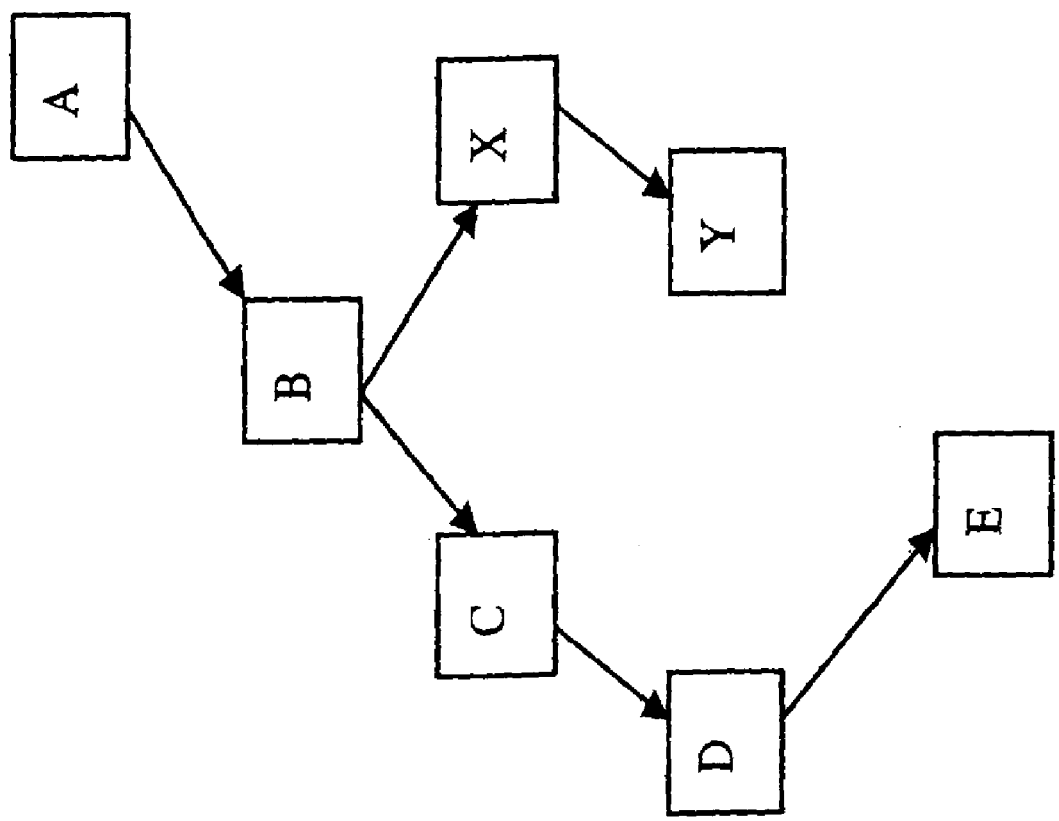
FIG. 1 shows an example control flow graph with basic blocks A, B, C, D, E, X, and Y.

One header can have multiple trailers as shown in the control flow graph in FIG. 1, ABCDE and ABXY. Cache organization as contemplated herein can use one of several already proposed next-trace predictor techniques [3] to identify the trailers of the different multi-path traces.

The trace constructor 108 is the logic that actually forms the traces. Traces are formed either at the issue or retirement of instructions. A set of rules is used to determine the termination of a particular trace construction. A sample set of rules includes: a maximum of 32 instructions, a maximum of 8 conditional branches, or encountering an indirect branch. Any of these conditions would be sufficient to terminate the construction of a trace.

A filtering buffer 106 is used to reduce pollution in the L0 "header" trace cache. The filtering buffer 106, typically including 4 to 8 entries, is used to hold newly built traces. Using a simple mechanism based on the usage of traces, the filtering buffer 106 distinguishes between 'hot' and 'cold' traces. All traces enter the filtering buffer 106 as "cold" traces. In one preferred embodiment, an n-bit frequency counter is stored along with the trace in the filter buffer. When the trace is first written to the filtering buffer 106, the frequency counter is initialized to 0. Every access of the trace in the filtering buffer 106 increments the frequency counter by 1. Once the frequency counter for a particular trace exceeds a pre-determined threshold value, for example, $2^{n-1}$, the mechanism classifies a trace as "hot". When a trace is classified as "hot", its "header" is promoted to the L0 trace cache. Simultaneously, the "header" and "trailer" are both written into the L1 trace cache 104. A trace which remains cold while resident in the filtering buffer 106 is finally replaced by another new trace using any of the known replacement algorithms, for example a least-recently-used algorithm. A cold trace replaced from the filtering buffer 106 is copied to the L1 trace cache 104, and the header of the cold trace is not stored in the L0 trace cache.

Figure 3A:
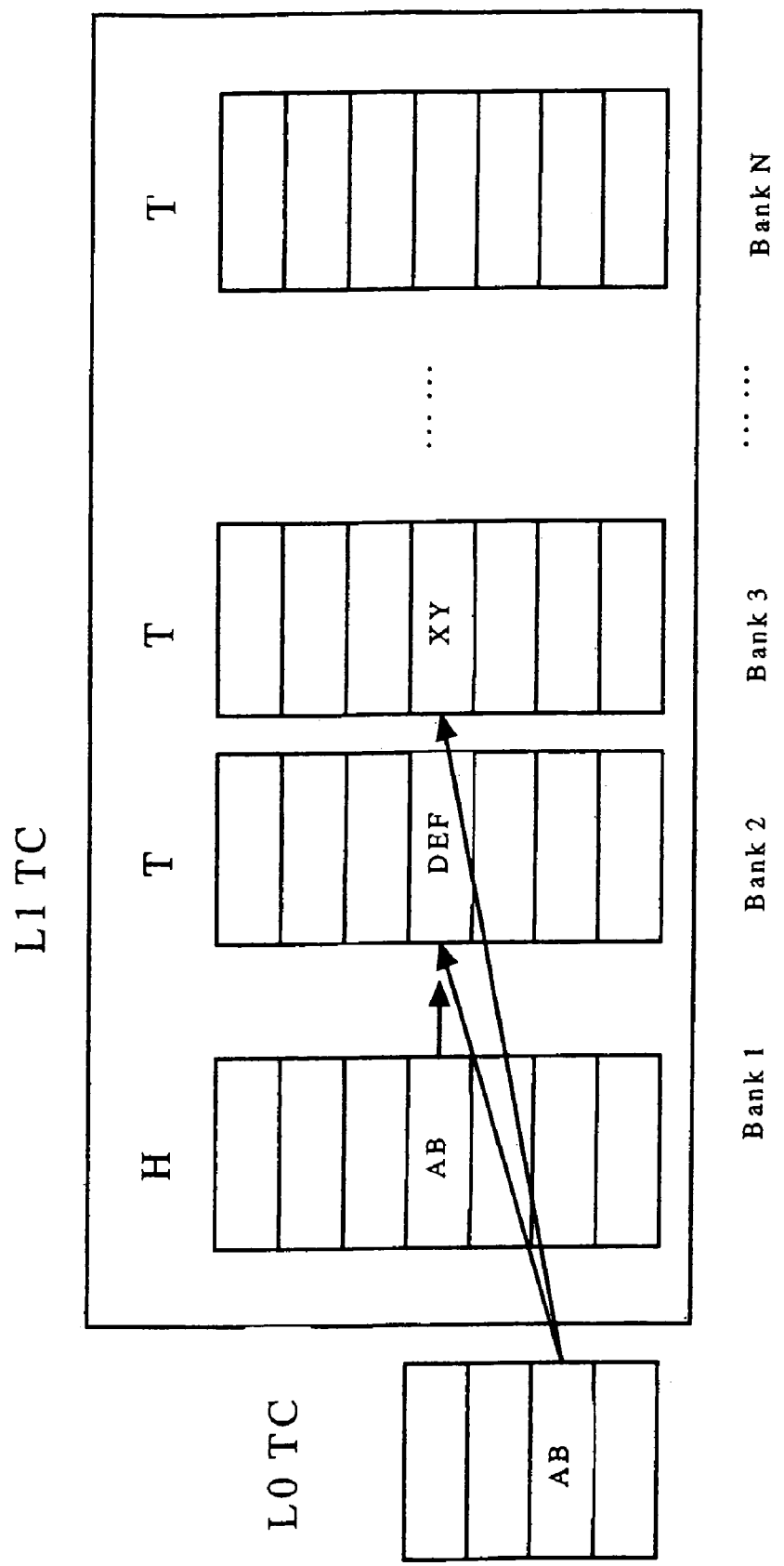
FIG. 3(a) shows a first embodiment of the trailer bank organization.
Figure 3B:
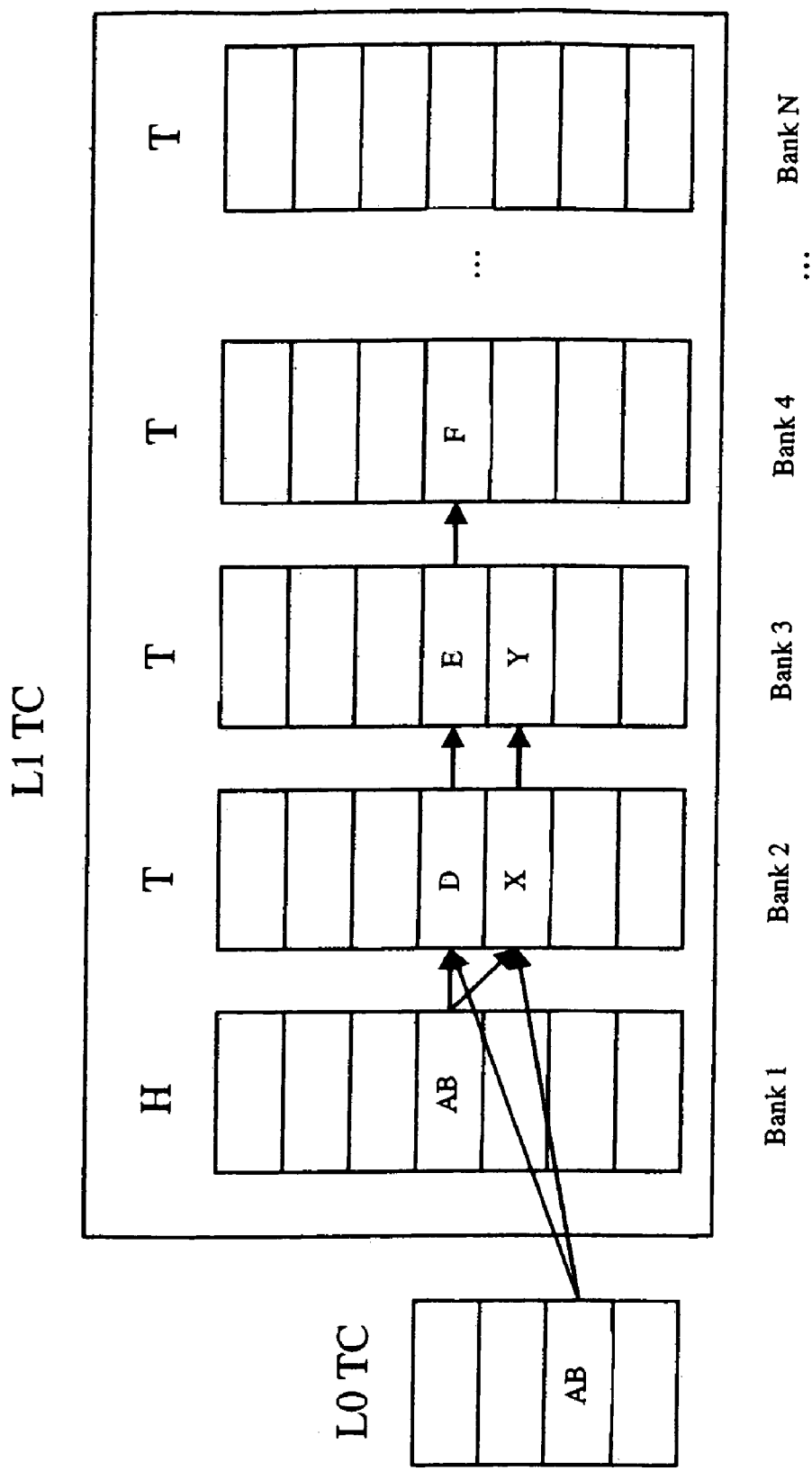
FIG. 3(b) shows a second embodiment of the trailer bank organization.

The L1 trace cache 104 is structured to exploit the benefits of the header-trailer design. One of the banks in the L1 trace cache is entirely devoted to storing the headers of traces. The 'header bank' is shortened to the maximum length of a header. The trailers of traces are stored in the trailer banks of the L1, and FIGS. 3(a)-3(b) show two preferred embodiments for the trailer organization. The 'header bank' in the L1 is denoted with an "H" and the 'trailer banks' with a "T". These trailers can all be located in the same set in the L1 (FIG. 3a), or they can be spread throughout the L1 trace cache (FIG. 3b). The approach shown in FIG. 3(a) stores each trailer in a single bank. This minimizes the logic necessary to actually issue the trailer to the fetch buffer. The technique in FIG. 3(b), on the other hand, breaks trailers and stores them similar to the blocks in a block-based trace cache. However, unlike the block-based trace cache, at least one embodiment of the present invention does not restrict a trailer to be split across basic blocks, and can accommodate as many instructions as possible in each trailer bank. Splitting trailers across multiple banks provides the most flexible and efficient storage of traces, but may require merging logic to issue the trace to the fetch buffer.

The separation of traces into headers and trailers also makes it easier to take advantage of the temporal locality of traces. 'Hot' traces, which tend to be issued frequently, have their headers stored in the L0 trace cache 102. A desirable goal herein is to reduce the effective access latency of the trace cache. For this reason, the size of the L0 cache 102 is optimized to provide minimum access time for the header portion of the trace. The filtering buffer 106 enables placing only the headers of "hot" traces in the L0 cache, thereby, reducing pollution of this small cache. In addition to this, a small L0 cache consumes less power compared to a traditional large trace cache.

A trace multiplexor 114 is used to select between traces coming from the L0 trace cache and the L1 trace cache. A traditional instruction cache (Icache) 112 is used as a backup for the trace cache. When an access misses both in the L0 and the L1 trace cache, the instructions are fetched directly from the Icache 112, and sent to the processing unit. A fetch buffer 116 is used to hold the instructions that are fetched either from the trace cache or from the Icache, before these instructions are sent to the processor.

A preferred embodiment for a next-trace predictor 110 follows along the lines of the scheme proposed in [3]. Preferably, in accordance with at least one embodiment of the present invention, the predictor 110 is used to pair a header with a trailer. The predictor in [3] is enhanced to assign each trace a unique identifier for the "header" portion and the "trailer" portion. The bits from the most recently issued trace identifier are combined with bits from other recently issued trace identifier to perform a lookup in the trace predictor. If a valid entry is found, the predictor issues the predicted header identifier, predicted trailer identifier, as well as the location of the header and trailer in the trace cache. The location is given using address fields for the L0 header cache index and the L1 header cache index. If the predictor mispredicts, it is updated once the correct header and trailer identifiers are known during execution. This update will occur after the proper trace is built and stored in the trace cache, or, if the trace is already present, the information would be known following an index into the trace cache. The details for handling mispredictions are similar to what have been discussed in [3].

It will be appreciated by those skilled in the art that other predictor embodiments can be easily substituted in the design. One such embodiment would only store the L1 location of the header and trailer and do a lookup in the L0 based on the predicted header identifier. Since the L0 cache is small and will likely suffer from many evictions, this would save the trouble of trying to keep the trace predictor up-to-date with the L0 cache. Yet, another embodiment of the trace predictor can have separate predictors for the header and the trailer. Since there are not as many headers as trailers, a smaller, faster, and simpler predictor could be used for predicting headers. A faster responding predictor would allow for more accurate prediction of the location of the header as being in either the L0 or L1. If separate predictor tables are implemented, separate header and trailer history registers could also be used for indexing into the prediction tables.

Figure 4:
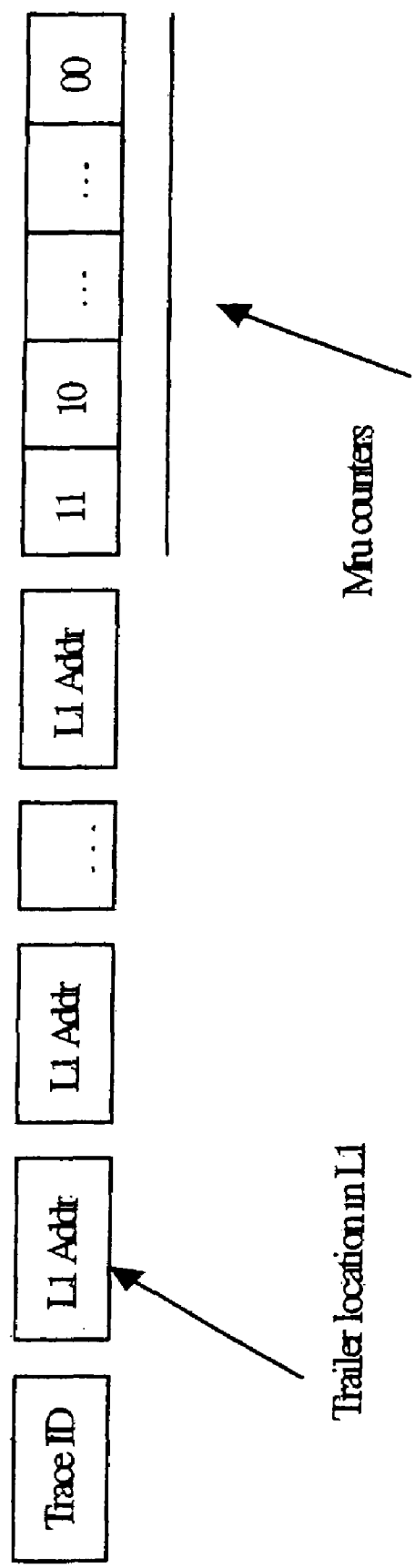
FIG. 4 shows the state information stored in an L0 cache directory entry.

In a preferred embodiment, the L0 cache directory stores additional information to easily locate the trailers associated with a given header. FIG. 4 shows the state information stored in an L0 cache directory entry.

L1_addr: This gives the exact set that the trailers for this header have been mapped to. If the trailers were mapped to different sets, this would involve multiple fields.

L1_banks: This indicates which banks in the L1 contain trailers for this header. There is one bit for each bank in the L1. This can be useful for locating the trailer quickly. It also reduces the amount of power consumed for a trace access since only one bank is used.

Mru_counter: These fields indicate the most recently used trailers that are currently stored in the L1. This allows for efficient replacement of trailers in the L1. These fields can be in the form of 2-bit counters.

Figure 5:
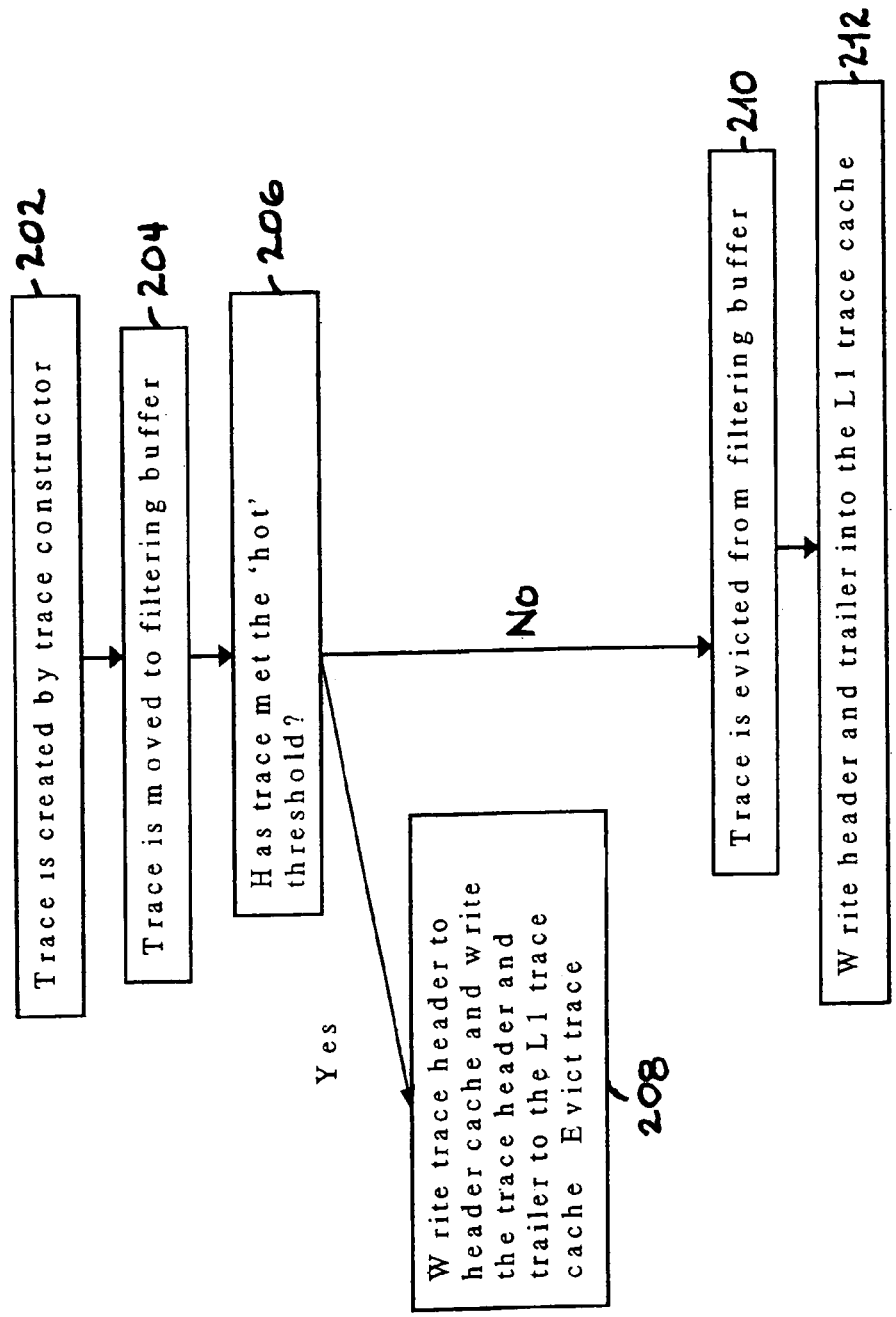
FIG. 5 shows a flowchart describing the high-level operations of a header-trailer trace cache.

There will now be described the operation of the header-trailer trace cache using an example trace ABDEF. FIG. 5 shows a general flow-chart of how a trace moves from the trace constructor to the header-trailer trace cache.

When a trace is first built (202), it is written to the filtering buffer (204). On a request, the filtering buffer supplies the entire trace while it is resident there. When the trace is either promoted (hot trace) or evicted (cold trace) from the filtering buffer, it is split into its header and trailer components. For example, the header could involve basic blocks A and B (which together comprise the first N instructions of this trace), and the trailer could be blocks DEF. At query 206, if the trace has been classified to be 'hot', its header is written to both the L0 and L1 trace cache (208). If the trace has been classified as 'cold', its header is written to only the L1 trace cache (210), whereby the trace is evicted from the filtering buffer and the header and trailer are written into the L1 trace cache (212). For both hot and cold traces, the trailer is written to the L1 trace cache. (Note: The header of prior cold traces in the filtering buffer can also be promoted to the L0 cache from the L1 cache after a trace turns 'hot' while resident in the L1 cache.) The bits of state for the header are then updated. L1_set is used to store the index of the trailer in the L1 cache. The first bit of L1_banks is set to "1" to indicate the location of the trailer. The first mru_counter is set to "11" to indicate the first trailer bank in the L1 was the most recently used for this header.

In addition to the trace cache 104, there is also a next-trace predictor 110 [3] (see FIG. 2). It stores the trace identifier of the next predicted trace, as well as the location of its header in the L0 or L1 (a single bit in the predictor can distinguish). It also stores the L1 index and bank of the predicted trailer. When trace ABDEF is predicted, the L0 is accessed to get the header. Since the predictor 110 also gives the location of the trailer, L1 cache access is initiated simultaneously. Since the exact location of the trailer in the L1 cache is known, the access time and the active power consumed are reduced. In this example, there is no need to update the mru_counter since only one version trace is stored.

Consider the situation when trace ABXY is to be written to the trace cache. Since this trace shares the same header information as ABDEF, no new instructions are written to the L0. If the trailer is written to the second trailer bank in the L1, then second bit of L1_banks will be set to '1'. The first mru_counter will be decremented to "10" and the second one will be set to "11".

If the trailers are split across multiple banks as shown in FIG. 3(b), different blocks of the trailer XY will be written to different banks. This requires doing a lookup in each bank that a trailer block is being written into. For example, block 'X' would be written into the first trailer bank. A lookup in this bank would be done to ensure that the block 'X' does not already exist in the bank. This lookup could be based on a hashing algorithm that uses X's starting address. If 'X' is already in the first trailer bank, nothing is written into the bank. Otherwise, it is written to the bank. The header is then updated with the location of 'X' in the first trailer bank. The same procedure is used to store block 'Y' in the second trailer bank.

This read will be exactly like the single path read, with the next-trace predictor providing the location of the proper header/trailer. The location of the trailer is checked with the state information in the L1 to verify that a trailer does still exist there. The proper mru_counter is then set to "11" and all others are decremented.

When a header is replaced in the L0 (due to capacity limitations), no action needs to be taken. Since the header is also present in the L1, a deletion from the L0 requires no movement of instructions back to the L1. If a header is deleted from the L1, its trailers can either be deleted or allowed to remain in the trace cache. If the entire trailer is stored in one bank in the L1 (FIG. 3(a)), then it might be best to delete the header's trailers and free up space. This would not cause much of an increase in trailer misses because there is a low likelihood that another header would use the exact trailer. If the trailers are split across banks as shown in FIG. 3(b), it would be beneficial to leave them in the trace cache as there is an increased likelihood of the trailer being shared by another header.

It is possible for a single trailer to be shared by multiple headers. Rather than trying to keep track of every header associated with the trailer and updating them when a trace is evicted, it is better if no action is taken. The appropriate headers will eventually update themselves when a trailer miss occurs.

If a trace header that is stored only in the L1 becomes 'hot', it is very easy and direct to copy it to the L0. A header is classified as 'hot' in a manner similar to the mechanism used for the filtering buffer described above.

Figure 6:
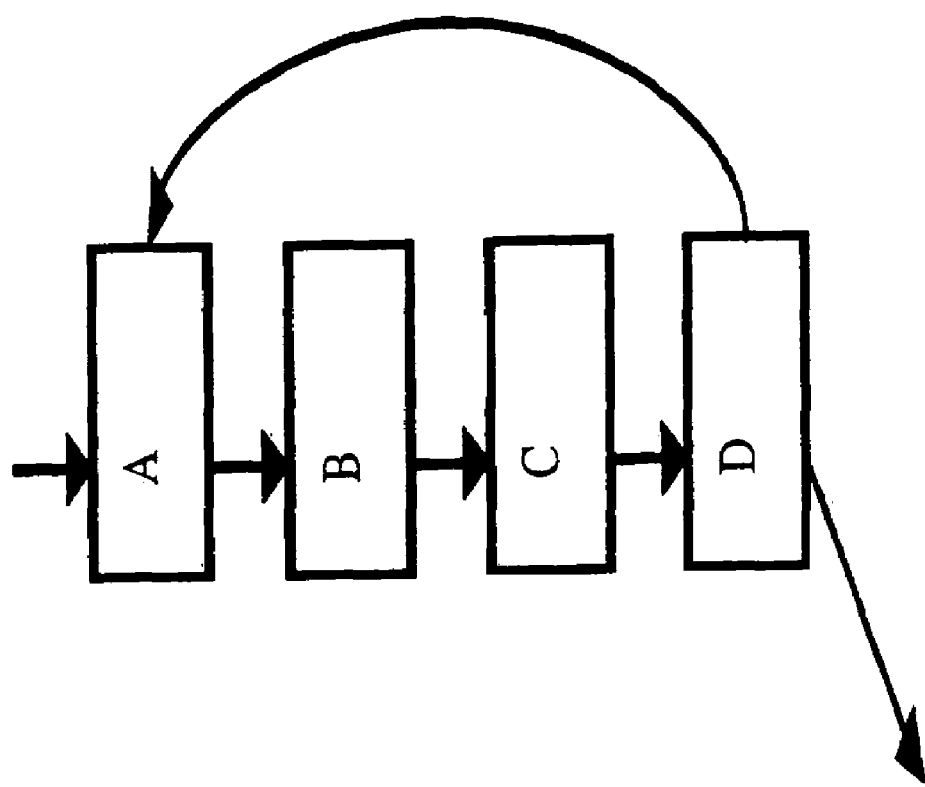
FIG. 6 shows an example loop with basic blocks A, B, C, and D.

During trace formation, loops can introduce a large amount of duplication in a trace cache. One source of this is when tight loops are unrolled into a long trace. Another form of redundancy can occur due to multiple execution paths merging. Consider the loop shown in FIG. 6 with basic blocks A, B, C, and D.

Figure 7:
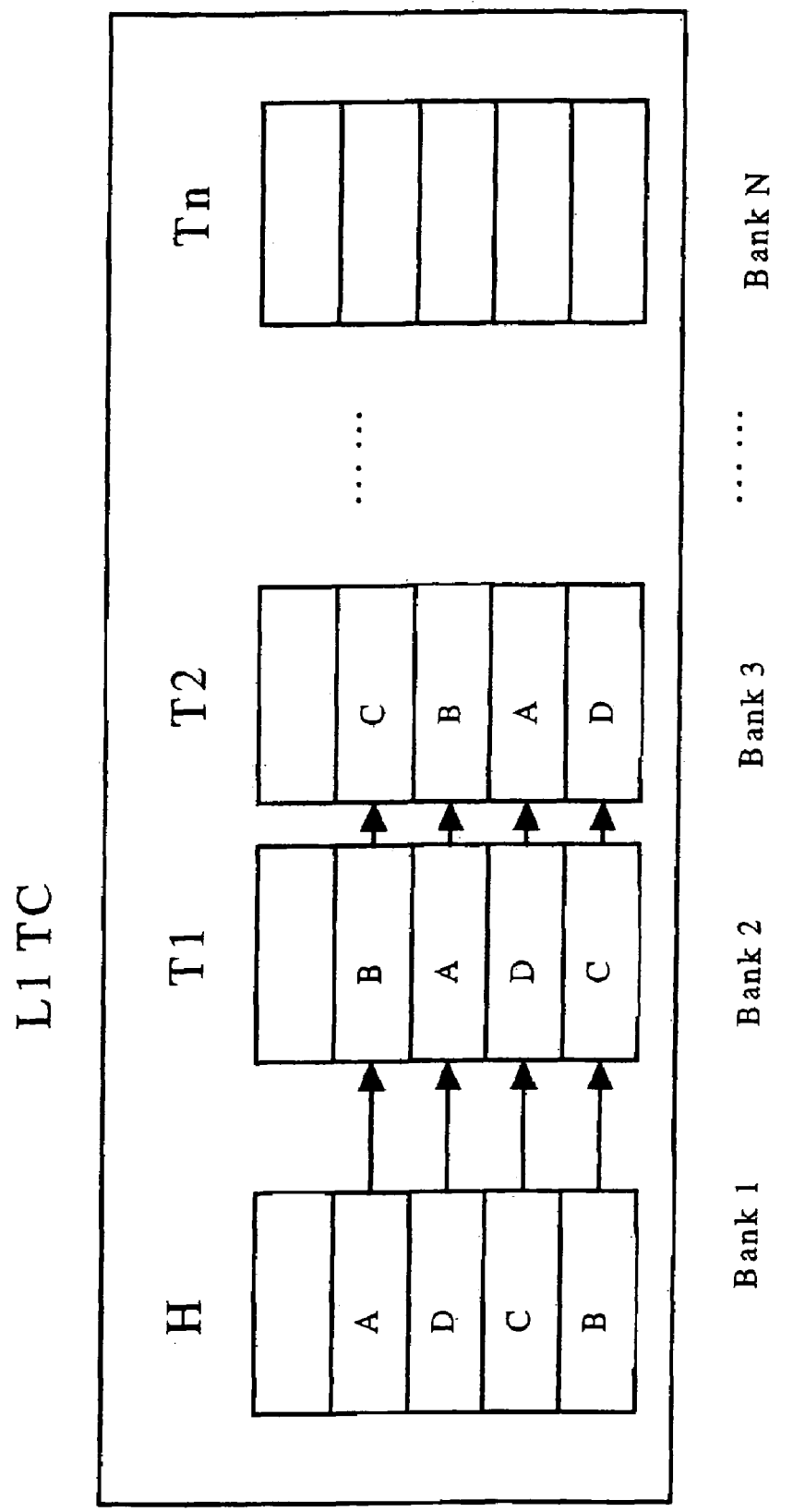
FIG. 7 shows example storage of the loop in FIG. 6 within the header-trailer trace cache.
Figure 8:
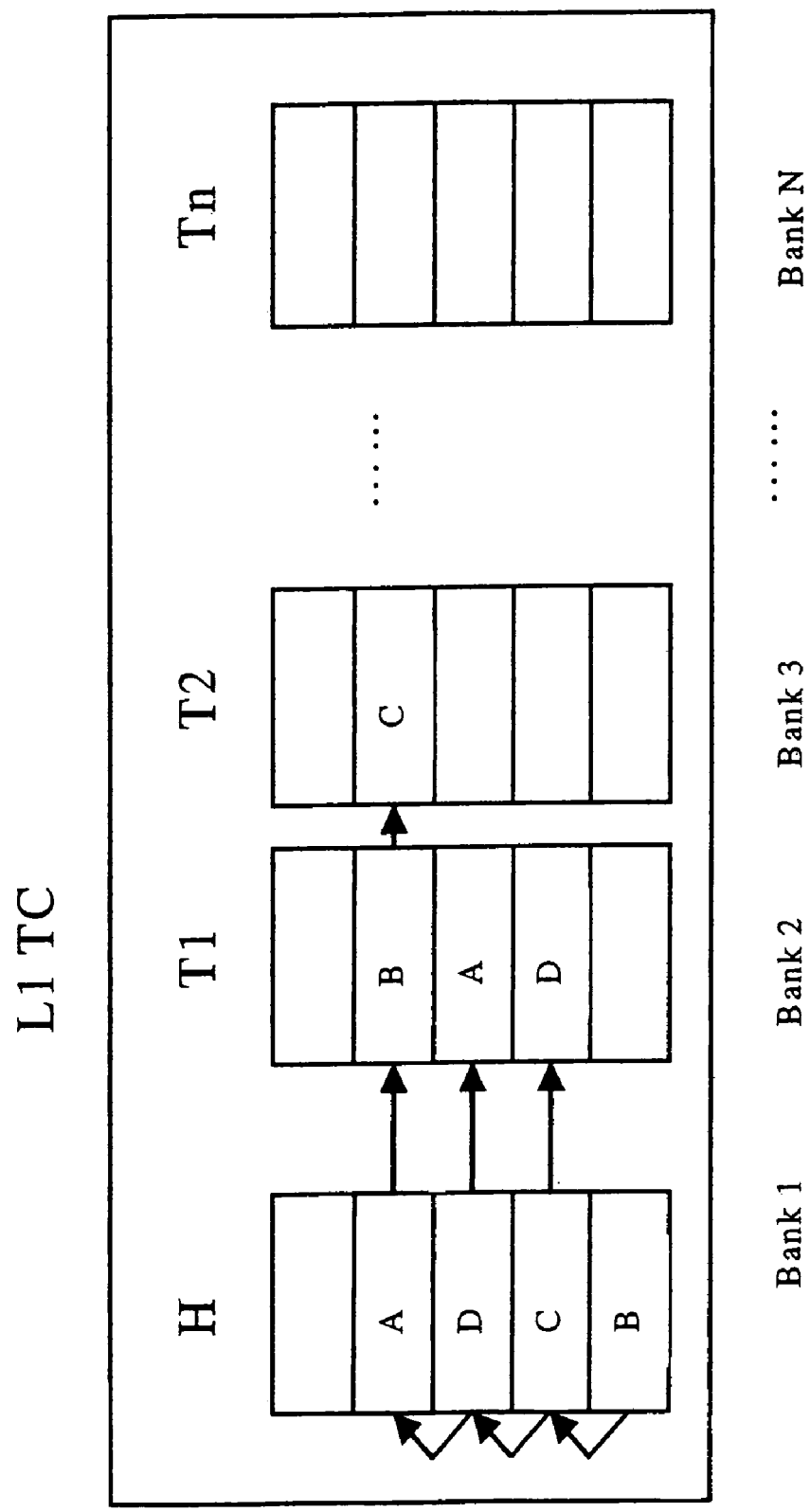
FIG. 8 shows an efficient loop storage, which exploits the header-trailer trace organization.

Due to the greedy nature of trace formation, multiple traces might be formed to store this loop: ABC, DAB, CDA, and BCD. These traces could potentially be stored in our L1 trace cache as shown in FIG. 7. However, if a trace header is issued before a trailer, the first part of the trailer can also come from a header bank location. If this ability is utilized, the traces can be stored in a much more efficient and compact manner as shown in FIG. 8.

For example, trace ABC can be issued from the trace cache following the normal procedure. To issue DAB, however, D is first issued from the header bank. On the following cycle, A is issued from the header bank and B is issued from the first trailer bank. To issue CDA, a similar procedure is followed. The amount of space required to store the unrolled loop in the L1 trace cache has decreased from 12 lines to 8 lines. And if one considers the access methodology used in the header trailer trace cache system described here, where the L0 header cache stores "hot" trace headers, the storage requirements here can further be optimized.

It is to be understood that the present invention, in accordance with at least one presently preferred embodiment, includes a header and a trace cache, which together may be implemented on at least one general-purpose computer running suitable software programs. They may also be implemented on at least one integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirely herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

REFERENCES

[1] D. Friendly, S. Patel, and Y. Patt, "Alternative Fetch and Issue Policies for the Trace Cache Fetch Mechanism." In Proceedings of the 30th International Symposium on Microarchitecture, December 1997.

[2] B. Black, B. Rychlik, and J. Shen, "The Block-Based Trace Cache." In Proceedings of the 26th International Symposium on Computer Architecture, May 1999.

[3] Q. Jacobson, E. Rotenberg, and J. E. Smith, "Path-based Next Trace Prediction." In *Proceedings of the 30th International Symposium on Microarchitecture*, December 1997.

What is claimed is:

1. A method of providing a trace cache organization system, said method comprising the steps of:

providing a header cache which stores only a header portion of traces; and providing a trace cache adapted to store header and trailer portions of traces, the trace cache comprising at least one hierarchical cache level;

wherein the header cache portion of said trace cache includes a single header bank and further wherein the header bank has a pointer pointing to a first sequential trailer trace bank;

wherein a trailer cache portion of said trace cache includes multiple cache banks; and at least one of the following (a), (b) and (c) prevails:

(a) the full trailer portion of a trace resides in only one cache bank;

(b) the trailer portion of a trace is broken up and distributed among multiple cache banks; and (c) each trailer bank has a pointer pointing to a next sequential trailer trace bank.

2. The method according to claim 1, wherein a subset of said header cache is a L0 cache.

3. The method according to claim 1, wherein said header cache is a L0 cache.

4. The method according to claim 1, wherein said trace cache is a L1 cache.

5. The method according to claim 1, further comprising:

holding traces and selectively passing on traces to said trace cache;

said step of holding traces and selectively passing on traces comprising distinguishing between;

hot traces for being passed on to L1 trace cache; in addition, whose headers are passed onto L0 header cache; and cold traces for being passed on to the L1 trace cache.

6. The method according to claim 5, wherein said distinguishing step comprises distinguishing a trace as a hot trace upon a frequency counter exceeding a predetermined threshold value.

7. The method according to claim 5, wherein said step of holding traces and selectively passing on traces comprises promoting a header of a hot trace to said header cache and writing a copy of a header and trailer of a hot trace to said trace cache.

8. The method according to claim 7, further comprising the step of replacing a cold trace in said filtering buffer, whereupon the cold trace is copied to said trace cache and a header of the cold trace is not promoted to said header cache.

* * * * *